United States Patent [19]

Arakawa

[11] 4,388,291
[45] Jun. 14, 1983

[54] PROCESS FOR THE PRODUCTION OF DITHIONITES

[75] Inventor: Satoshi Arakawa, Matsudo, Japan

[73] Assignee: Mitsubishi Gas Chemical Co., Inc., Tokyo, Japan

[21] Appl. No.: 386,059

[22] Filed: Jun. 7, 1982

[30] Foreign Application Priority Data

Jun. 18, 1981 [JP] Japan .................................. 56-94172

[51] Int. Cl.$^3$ ............................................. C01B 17/66
[52] U.S. Cl. ................................................. 423/515
[58] Field of Search ....................... 423/514, 515, 516

[56] References Cited

U.S. PATENT DOCUMENTS

| | | | |
|---|---|---|---|
| 3,718,732 | 2/1973 | Winslow, Jr. et al. | 423/515 |
| 3,961,034 | 6/1976 | Bostian et al. | 423/515 |
| 4,042,674 | 8/1977 | Yamamoto et al. | 423/515 |
| 4,042,675 | 8/1977 | Yamamoto et al. | 423/515 |

FOREIGN PATENT DOCUMENTS

| | | | |
|---|---|---|---|
| 35759 | 9/1981 | European Pat. Off. | 423/515 |
| 1434541 | 2/1966 | France | 423/515 |
| 46-18373 | 5/1971 | Japan | 423/515 |

*Primary Examiner*—Gary P. Straub
*Attorney, Agent, or Firm*—Frishauf, Holtz, Goodman & Woodward

[57] ABSTRACT

An improvement in the process for producing anhydrous dithionites by reacting formic acid or a formate with an alkali compound and sulfurous acid anhydride in a mixture of water and organic solvent; filtering dithionite crystals from the mother liquor; and washing the dithionite crystals with an organic solvent as a washing liquid and then drying the dithionite crystals. The improvement comprises dividing the washing liquid into two portions which are discharged as the washing liquid first discharged and the washing liquid discharged subsequently from the washing operation and treating the washing liquid first discharged to convert substances contained therein which inhibit the production of dithionite into harmless substances and recycling both the treated washing liquid first discharged and the washing liquid discharged subsequently which does not require treatment as a reaction solvent.

14 Claims, No Drawings

PROCESS FOR THE PRODUCTION OF DITHIONITES

BACKGROUND OF THE INVENTION

The present invention relates to a process for the production of dithionites.

It has been known that anhydrous dithionites can be prepared by a process which comprises reacting formic acid or a formate, alkali compounds, and sulfurous acid anhydride in a mixture of water and organic solvent. In this process, the dithionites precipitate in the reaction solution as the reaction proceeds and, therefore, after the reaction is completed, the dithionites thus precipitated can be separated from the mother liquor by filtration to obtain crystals of the dithionites.

If the thus-obtained crystals are dried, the purity of the dithionite product is low because impurities contained in the mother liquor remain on and/or in the crystals. Furthermore, the water contained in the mother liquor seriously retards drying and accelerates decomposition of the dithionites. This decomposition of the dithionites is very dangerous. At high rates of decomposition, the dithionites may catch fire in the drying apparatus. Usually, therefore, it is essential that the crystals of the dithionites separated from the mother liquor by filtration are fully washed with an organic solvent, e.g. methanol or ethanol, prior to being dried to remove the mother liquor remaining on and/or in the crystals which contains water and salt impurities.

Techniques for washing dithionites have rarely been reported and it has been merely reported that dithionite crystals are washed with an organic solvent after the filtration thereof. In general, the washing liquid used is purified by distillation, for example, either independently or in combination with the mother liquor to recover the organic solvent. For example, Japanese patent publication No. 38556/1973 discloses that alcohols used in the reaction can be recovered by distillation and reused. This distillation, however, requires a great amount of energy. It is necessary from the view point of energy saving to solve such a problem.

When a solution containing thiosulfates, resulting from the reaction of synthesizing dithionites, is recycled and reused in the reaction, the thiosulfates have an adverse influence on the reaction. This gives rise to the problems that the reaction of synthesizing the dithionites is inhibited and the decomposition of the resulting dithionites is undesirably accelerated.

SUMMARY OF THE INVENTION

In the process of washing of crystals of dithionites prepared by reacting formic acid or a formate, alkali compounds, and sulfurous acid anhydride in a mixture of water and organic solvent, it has been discovered that when a washing liquid is contacted with the dithionite crystals and, thereafter, is discharged out of the system, the washing liquid discharged at earlier stages contain undesirable substances, such as thiosulfate, which exert an adverse influence on the production of dithionites, whereas the washing liquid discharged at later stages contains so low a level of the undesirable substances such as thiosulfate that it can be reused as a solvent for production of dithionites without any treatment.

The present invention provides a process for producing anhydrous dithionites which comprises reacting a formic acid or a formate, an alkali compound, and sulfurous acid anhdyride in a mixed solvent of water and organic solvent, filtering the resulting dithionite crystals from the mother liquor, washing the dithionite crystals with an organic solvent as a washing liquid, and drying the dithionite crystals; characterized in that in the washing step, the washing liquid discharged is divided into two portions as a washing liquid first discharged and a washing liquid discharged subsequently, the washing liquid first discharged and the washing liquid discharged subsequently being collected separately, the washing liquid first discharged being subjected to an operation of converting substances inhibiting the production of dithionites into substances which do not exert an adverse influence on the production of dithionites to be recycled as a reaction solvent, and the washing liquid discharged subsequently being recycled as a reaction solvent without the need for any treatment.

DETAILED DESCRIPTION OF THE INVENTION

In accordance with the present invention, dithionites can be prepared by reacting formic acid or a formate, alkali compounds, and sulfurous acid anhydride in a mixed solvent of water and organic solvent. Since solubility of dithionites in the mixed solvent is very low, the resulting dithionites are precipitated. After the reaction is completed, the dithionites thus precipitated can be separated from the mother liquor by filtration. The crystals of the dithionites separated by filtration still contain a small amount of the mother liquor comprising the raw material, such as formic acid or a formate; intermediates, such as bisulfites; by-products, such as thiosulfates; water; and the organic solvent. The crystals are fully washed with an organic solvent as the washing liquid to remove the mother liquor contained on and/or in the crystals.

In the present invention, the washing operation of the crystals is carried out without stirring. That is, the washing operation is performed by bringing the washing liquid into contact with the crystal layer under conditions which do not cause a slurry to form and allowing the washing liquid to pass through the crystal layer under pressure or suction. In the washing step of the present invention, the washing liquid discharged out of the system is divided into the washing liquid first discharged (a first discharge liquid) and the washing liquid discharged subsequently (a second discharge liquid) and both of the discharge liquids are collected separately.

The process can be carried out by adding all of the washing liquid, washing, and sequentially removing the washing liquid in two portions, i.e. (1) the first discharge liquid and (2) the second discharge liquid. Alternately, the washing liquid may be divided into two portions. The first portion is used to wash the crystals to obtain the first discharge liquid, followed by washing with the second portion to obtain the second discharge liquid.

The former method is preferred compared with the latter method, because of simplicity and utility.

The amount of the first discharge liquid is preferably from 20 to 80% by weight and more preferably from 20 to 60% by weight, based on the weight of the crystals.

The first discharge liquid thus withdrawn is treated to convert undesirable substances inhibiting the production of dithionites into substances which do not exert an adverse influence on the production of dithionites, and thereafter, is used as a reaction solvent. For converting the undesirable substances inhibiting the production of dithionites into substances which do not exert an adverse influence on the production of dithionites, it is effective to add to the first discharge liquid at least one compound selected from the group consisting of the compounds represented by the formulae (I) and (II), and cyclohexene oxide.

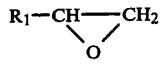 Formula (I)

wherein $R_1$ is hydrogen, an alkyl group containing from 1 to 8 carbon atoms, a halogenated alkyl group containing from 1 to 2 carbon atoms, phenyl group or a substituted phenyl group.

 Formula (II)

wherein $R_2$ is a primary or secondary alkyl group containing from 1 to 8 carbon atoms, an allyl group or a 2-methylallyl or 2-ethylallyl group, and X is a halogen atom.

Examples of the compounds represented by the formula (I) include ethylene oxide, propylene oxide, butylene oxide, epichlorohydrin, epibromohydrin, and styrene oxide. Examples of the compounds represented by the formula (II) include methyl iodide and allyl chloride.

Preferred from an economic viewpoint are ethylene oxide, propylene oxide, epichlorohydrin, butylene oxide, allyl chloride, and methyl iodide. Of these compounds, ethylene oxide, propylene oxide, and epichlorohydrin are particularly preferred.

These compounds are added in an amount of from 1 to 3 moles, preferably from 1 to 2 moles, per mole of thiosulfate contained in the first discharge liquid.

Formic acid or a formate used in the preparation of dithionites are those conventionally used in the same reaction. Formic acid, and formates, including the metal salts and esters of formic acid such as sodium formate, potassium formate, zinc formate, and the methyl ester of formic acid are examples of said formic acid or a formate.

Examples of alkali compounds as used herein include sodium hydroxide and sodium carbonate.

Dithionites can be prepared by reacting formic acid or a formate, alkali compounds, and sulfurous acid anhydride in a mixed solvent of water and organic solvent under known conditions. (see U.S. Pat. Nos. 2,010,615, 3,917,807 and 3,927,190, Japanese patent publication No. 16409/1972 and British Pat. No. 145,798) Organic solvents which can be used in the mixed solvent include methanol, ethanol, n-propanol, isopropanol, and acetone. Of these solvents, methanol is particularly preferred.

Washing liquids which can be used in the invention are organic solvents such as methanol, ethanol, n-propanol, isopropanol, and acetone. The washing liquid may be the same as or different from the organic solvent used in the mixed solvent. It is preferable that the washing liquid is the same as the organic solvent used in the mixed solvent as a process advantage. It is most preferred to use methanol as a washing liquid and, at the same time, as an organic solvent for the mixed solvent. According to the present invention, sodium dithionite, potassium dithionite, zinc dithionite and the like can be produced. In the present invention, other organic solvents, other alkali compounds and other formic acid or a formate than those described hereinbefore can also be used.

In accordance with the process of the invention, a washing liquid which contains only very low levels of undesirable substances such as thiosulfate having an adverse effect on the production of dithionites, and which has a high content of the organic solvent, can be recovered as a second discharge liquid, and thus, the washing liquid can be used as a reaction solvent (e.g., a solvent at the start of the reaction, a solvent for use in dissolving materials for the reaction, or a solvent to be additionally supplied) without any treatment. In the first discharge liquid which initially contains substances which inhibit the production of dithionites, said substances are converted into substances which do not exert an adverse influence on the production of dithionites, and it can be used as a solvent in the production of dithionites. The process of the invention, therefore, does not need purification, i.e., distillation, of the washing liquid, thereby resulting in the saving of a large amount of energy.

The following examples are given to illustrate the invention in greater detail. However, the scope of the present invention is not limited by the examples. Parts and percents in the Examples are by weight unless otherwise specified.

EXAMPLE 1

(1) Eighty-one parts of sodium formate were dissolved in 74 parts of hot water, and 105 parts of methanol were added thereto to prepare a slurry. The slurry thus prepared was placed in a reactor equipped with a stirrer, a thermometer, a reflux condenser, a cold trap for collecting low boiling point substances, tanks for supplying starting materials, and a heating jacket. The slurry was heated up to 82° C. with stirring at a pressure of 1.0 kg/cm² Gauge. A solution of 105 parts of sulfurous acid anhydride in a mixture of 276 parts of methanol and 16 parts of methyl formate, and 69 parts of a 50% sodium hydroxide solution, were separately added to the slurry over a period of 90 minutes. After these additions, the stirring was continued for 150 minutes at the above temperature and pressure.

The resulting reaction mixture was cooled down to 73° C. The crystals were separated from the mother liquor by filtering under pressure by the use of carbon dioxide gas. Thereafter, 120 parts of methanol as the washing liquid was charged into the filtration vessel to wash the crystals. In this washing, the crystals were brought into contact with the methanol and soaked therein. And then, carbon dioxide gas under pressure was introduced into the vessel to allow methanol to pass through the crystal layer. The washing liquid (methanol) discharged out of the vessel was collected separately as two portions of 48 parts of a first discharge liquid and 72 parts of a second discharge liquid. The crystals were dried at a temperature of 75°–90° C. under reduced pressure for 90 minutes to obtain the product. The yield of the dithionite product, i.e., sodium dithionite, was 116.5 parts, and the purity of the product was 92.3%.

(2) The methanol content of the first discharge liquid was 87.1%. This first discharge liquid was treated with each of the compounds shown in Table 1 under the conditions also shown in Table 1 in order to convert sodium thiosulfate (0.15 part) into compounds which do not exert an adverse influence on the subsequent reaction. The thus-treated first discharge liquid (37.9 parts) was mixed with 72 parts of the second discharge liquid. Using the resulting mixture in place of 105 parts of the methanol, the same procedure as described above was repeated to prepare sodium dithionite. In this case, since the first discharge liquid contained 3.6 parts of water, sodium formate was dissolved in 70.4 parts of hot water.

Crystals formed in the above reaction reusing the first discharge liquid and the second discharge liquid were separated from the mother liquor and washed with 120 parts of methanol as washing liquid. In this washing, the crystals were contacted with the methanol and soaked therein. And then, carbon dioxide gas under pressure is introduced into the filtration vessel to allow methanol to pass through the crystal layer. The washing liquid (methanol) discharged out of the vessel was collected separately as 48 parts of a first discharge liquid and 72 parts of a second discharge liquid. The crystals were dried at a temperature of 75°–90° C. under reduced pressure for 90 minutes to obtain the product. The yield of the product, i.e., sodium dithionite, and the purity of the product are shown in the two right-hand columns of Table 1.

TABLE 1

| Compound added to First Discharge Liquid | Processing Conditions* | | Reaction Results | |
|---|---|---|---|---|
| | Amount of Compound added (parts) | Temperature (°C.) | Time (hrs) | Yield (parts) | Purity (%) |
| Ethylene oxide | 0.08 | 25 | 24 | 116.2 | 92.2 |
| Epichlorohydrin | 0.09 | 45 | 3 | 116.3 | 92.0 |
| Epibromohydrin | 0.13 | 45 | 3 | 116.6 | 91.9 |
| Butylene oxide | 0.07 | 45 | 6 | 116.1 | 92.1 |
| Propylene oxide | 0.11 | 25 | 24 | 115.3 | 92.0 |
| Methyl iodide | 0.20 | 45 | 1 | 117.0 | 92.2 |
| Allyl chloride | 0.11 | 45 | 6 | 115.9 | 91.9 |

*the conditions in which the first discharge liquid was treated

COMPARATIVE EXAMPLE

Sodium dithionite was prepared in the same manner as described for the first reaction in Example 1 (1), wherein fresh methanol was used as a reaction solvent. Sodium dithionite crystals thus prepared were separated from the mother liquor and subsequently were washed with 120 parts of methanol as the washing liquid. The washing liquid (methanol) discharged out of the filtration vessel was collected without dividing into a first discharge liquid and a second discharge liquid.

Using the thus collected methanol in place of the fresh methanol as a solvent at the start of the reaction, the same procedure as described above was repeated to prepare sodium dithionite. The yield of the product was 107 parts, and the purity of the product was 89.5%.

EXAMPLE 2

(1) Sodium dithionite was prepared in the same manner as described for the first reaction in Example 1 (1), wherein fresh methanol was used as a reaction solvent. Sodium dithionite crystals thus prepared were separated from the mother liquor by filtering under pressure by the use of carbon dioxide gas. Subsequently the crystals were washed with 120 parts of methanol as the washing liquid. In this washing, the crystals were soaked in the methanol in the filtration vessel. And then, carbon dioxide gas under pressure was introduced into the vessel to allow methanol to pass through the crystal layer. The washing liquid (methanol) discharged out of the vessel was collected separately as two portions of 48 parts of a first discharge liquid and 72 parts of a second discharge liquid.

(2) Seventy-two parts of the second discharge liquid, 204 parts of methanol obtained by distilling the mother liquor, and 16 parts of methyl formate were mixed to prepare a solution I. The first discharge liquid was treated with each of the compounds shown in Table 2 to convert sodium thiosulfate (0.2 part) contained therein into substances which do not exert an adverse influence on the subsequent reaction. The methanol content of the thus-treated first discharge liquid was 87.1%, and there was present 4.6 parts of water in 48 parts of the above discharge liquid.

The same procedure as described above (1) was repeated to prepare sodium dithionite except that (i) the solution I as prepared above was used in place of the solution consisting of 276 parts of methanol and 16 parts of methyl formate in order to dissolve therein 105 parts of sulfurous acid anhydride, and that (ii) 48 parts of the above treated first discharge liquid and 63.2 parts of methanol were used in place of 105 parts of the methanol, and that (iii) 69.4 parts of hot water was used in place of 74 parts of hot water to dissolve sodium formate.

The yield of the product, i.e., sodium dithionite, and the purity of the product are shown in the two right-hand columns of Table 2.

TABLE 2

| Compound added to First Discharge Liquid | Processing Conditions* | | | Reaction Results | |
|---|---|---|---|---|---|
| | Amount of Compound added (parts) | Temperature (°C.) | Time (hrs) | Yield (parts) | Purity (%) |
| Ethylene oxide | 0.08 | 25 | 24 | 115.9 | 92.3 |
| Epichlorohydrin | 0.12 | 45 | 3 | 116.6 | 92.2 |
| Epibromohydrin | 0.18 | 45 | 3 | 116.9 | 92.1 |
| Butylene oxide | 0.10 | 45 | 6 | 116.0 | 92.0 |
| Propylene oxide | 0.15 | 25 | 24 | 115.2 | 91.8 |
| Methyl iodide | 0.27 | 45 | 1 | 116.9 | 92.3 |
| Allyl chloride | 0.15 | 45 | 6 | 116.2 | 92.3 |

*the conditions in which the first discharge liquid was treated

EXAMPLE 3

(1) Sodium dithionite was prepared in the same manner as described for the first reaction in Example 1 (1), wherein fresh methanol was used as a reaction solvent. Sodium dithionite crystals thus prepared were separated from the mother liquor by filtering under pressure by the use of carbon dioxide gas. Subsequently the crystals were washed with 120 parts of methanol as the washing liquid. In this washing, the crystals were soaked in the methanol in the filtration vessel. And then, carbon dioxide gas under pressure was introduced into the vessel to allow methanol to pass through the crystal layer. The washing liquid (methanol) discharged out of the vessel was collected separately as two portions of 48 parts of a first discharge liquid and 72 parts of a second discharge liquid.

(2) Seventy-two parts of the second discharge liquid and 33 parts of methanol obtained by distilling the mother liquor were mixed to prepare a solution II. The first discharge liquid was treated with each of the compounds shown in Table 3 to convert sodium thiosulfate (0.2 part) contained therein into substances which do not exert an adverse influence on the subsequent reaction. The methanol content of the thus treated first discharge liquid was 87.1%, and there was present 4.6 parts of water in 48 parts of the above discharge liquid.

The same procedure as described above (1) was repeated to prepare sodium dithionite except that (i) the solution II as prepared above was used in place of 105 parts of methanol, and that (ii) 48 parts of the above treated first discharge liquid, 234.2 parts of methanol obtained by distilling the mother liquor, and 16 parts of methyl formate were used in place of the solution consisting of 276 parts of methanol and 16 parts of methyl formate in order to dissolve therein 105 parts of sulfurous acid anhydride, and that (iii) 64.4 parts of a 53.6% sodium hydroxide solution were used in place of 69 parts of a 50% sodium hydroxide solution.

The yield of the product, i.e., sodium dithionite, and the purity of the product are shown in the two right-hand columns of Table 3.

TABLE 3

| Compound added to First Discharge Liquid | Processing Conditions* | | | Reaction Results | |
|---|---|---|---|---|---|
| | Amount of Compound added (parts) | Temperature (°C.) | Time (hrs) | Yield (parts) | Purity (%) |
| Ethylene oxide | 0.08 | 25 | 24 | 116.4 | 92.0 |
| Epichlorohydrin | 0.12 | 45 | 3 | 116.8 | 91.9 |
| Epibromohydrin | 0.18 | 45 | 3 | 116.2 | 92.2 |
| Butylene oxide | 0.10 | 45 | 6 | 115.8 | 92.4 |
| Propylene oxide | 0.15 | 25 | 24 | 116.0 | 92.3 |
| Methyl iodide | 0.27 | 45 | 1 | 117.2 | 92.4 |
| Allyl chloride | 0.15 | 45 | 6 | 116.3 | 92.1 |

*the conditions in which the first discharge liquid was treated

What is claimed is:

1. In the process for producing anhydrous dithionites which comprises reacting (i) formic acid or a formate, (ii) an alkali compound, and (iii) sulfurous acid anhydride in a mixed reaction solvent of water and an organic solvent to form dithionite crystals in a mother liquor, filtering said dithionite crystals from the mother liquor, washing the dithionite crystals with an organic solvent as a washing liquid under conditions which do not cause a slurry to form, and drying the dithionite crystals;

the improvement comprising dividing the washing liquid into two portions which are discharged as (a) the washing liquid first discharged and (b) the washing liquid discharged subsequently, the washing liquid first discharged which contains thiosulfate which inhibits the reaction forming said dithionite and the washing liquid discharged subsequently being collected separately, the washing liquid first discharged is treated by adding thereto at least one compound selected from the group consisting of the compounds represented by the formulae (I) and (II), and cyclohexene oxide; wherein Formula (I) is

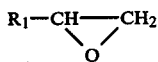

wherein
$R_1$ is hydrogen, an alkyl group containing from 1 to 8 carbon atoms, a halogenated alkyl group containing from 1 to 2 carbon atoms, phenyl group or a substituted phenyl group;

Formula (II) is $R_2-X$ wherein
$R_2$ is a primary or secondary alkyl group containing from 1 to 8 carbon atoms, an allyl group, or a 2-methylallyl or 2-ethylallyl group, and X is halogen, to convert said thiosulfate into a substance which does not exert an adverse influence on the production of dithionites and then recycling said treated washing liquid first discharged as a reaction solvent, and recycling the washing liquid discharged subsequently as a reaction solvent which does not require treatment.

2. The process of claim 1, wherein said washing liquid first discharged and said washing liquid discharged subsequently are separately collected by washing the dithionite crystals with all of the organic solvent, followed by discharging the washing liquid in two sequential stages.

3. The process of claim 1, wherein the filtered dithionite cyrstals are washed by the organic solvent washing liquid in two stages by sequentially providing first and second portions of said washing liquid; said washing liquid first discharged being obtained by washing the dithionite crystals with the first portion, and said washing liquid discharged subsequently being obtained by washing the dithionite crystals with the second portion.

4. The process of claim 1, wherein said washing liquid first discharged is in an amount of from 20 to 80% by weight based on the weight of the dithionite crystals.

5. The process of claim 1 wherein said washing liquid first discharged contains thiosulfate and wherein said at least one compound added thereto is added in an amount of from 1 to 3 moles per mole of thiosulfate contained in said washing liquid first discharged.

6. The process of claim 1, wherein said at least one compound which is added to said washing liquid first discharged is selected from the group consisting of ethylene oxide, propylene oxide, butylene oxide, epichlorohydrin, epibromohydrin, styrene oxide, methyl iodide, allyl chloride, and cyclohexene oxide.

7. The process of claim 1 wherein said at least one compound which is added to said washing liquid first discharged is selected from the group consisting of ethylene oxide, propylene oxide, epichlorohydrin, butylene oxide, allyl chloride and methyl iodide.

8. The process of claim 1 wherein said at least one compound which is added to said washing liquid first discharged is selected from the group consisting of ethylene oxide, propylene oxide and epichlorohydrin.

9. The process of claim 8 wherein said formic acid or a formate is sodium formate and wherein said anhydrous dithionite is sodium dithionite.

10. The process of claim 1 wherein said organic solvent is selected from the group consisting of methanol, ethanol, n-propanol, isopropanol and acetone.

11. The process of claim 1 wherein said organic solvent is methanol.

12. The process of claim 1 wherein said formic acid or a formate is selected from the group consisting of formic acid, sodium formate, potassium formate, zinc formate and methyl formate.

13. The process of claim 1 wherein said formic acid or a formate is sodium formate and wherein said anhydrous dithionite is sodium dithionite.

14. The process of claim 11 wherein said formic acid or a formate is sodium formate and wherein said anhydrous dithionite is sodium dithionite.

* * * * *